E. MURRAY.
WHEEL OF MOTOR CYCLES AND OTHER VEHICLES.
APPLICATION FILED MAR. 15, 1915.

1,142,606.

Patented June 8, 1915.

THE NORRIS PETERS CO., WASHINGTON, D. C.

UNITED STATES PATENT OFFICE.

ESTHER MURRAY, OF BAYSWATER, LONDON, ENGLAND.

WHEEL OF MOTOR-CYCLES AND OTHER VEHICLES.

1,142,606. Specification of Letters Patent. Patented June 8, 1915.

Application filed March 15, 1915. Serial No. 14,596.

*To all whom it may concern:*

Be it known that I, ESTHER MURRAY, lecturer, of 62ª Queens road, Bayswater, London, W., England, have invented certain new and useful Improvements in the Wheels of Motor-Cycles and other Vehicles, of which the following is a specification.

My invention relates to improvements in the wheels of motors, cycles and other vehicles and consists of a spring wheel element of special design being small or narrow at its top portion and wide at its bottom portion, and its bottom portion is curved to the rim circle for most of its length. The portion not curved to the circle of the rim can rock either way on the rim upon a bracket fixed to the rim which fits into a concave portion of the spring in order to enable the spring to avoid sliding along the rim, which also drives the rim.

The hub is of ordinary dimensions and is composed of a number of beds which the springs fit into, or it may be made with a number of webs projecting from the boss which fit into the springs, and communicate a drive to the springs. Side flanges on the hub and rim prevent lateral displacement.

In order that my invention may be properly understood and readily carried into effect, I have hereunto appended one sheet of drawings of which—

Figure 1:
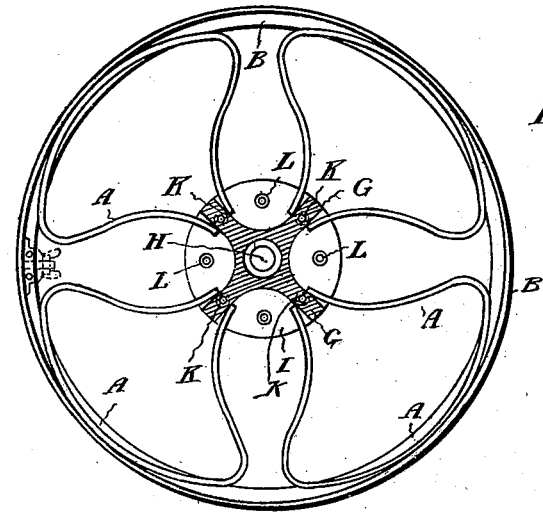
Figure 2:
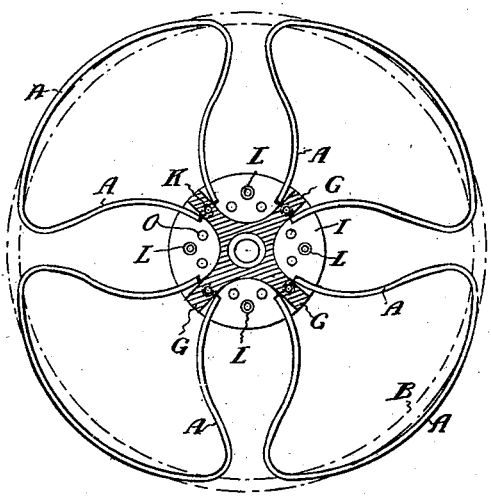
Figure 3:
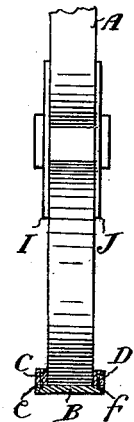
Figure 4:
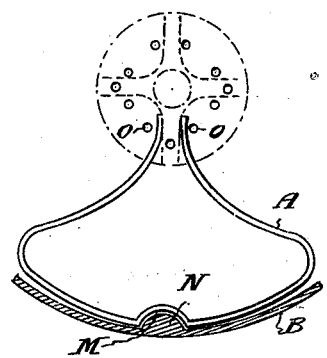

Figure 1 is a side elevation of a vehicle wheel made in accordance with and embodying my invention showing the hub in section and one of the rim rings removed. Fig. 2 is a similar view to Fig. 1 of the same wheel (with the rim in dotted lines) illustrating the spring, constituting my improvements expanded as it would be before being fitted to the rim of the wheel. Fig. 3 is a front view of part of the spring, rim, and rim rings of the wheel. Fig. 4 is a side elevation of a portion of a modified form of spring and rim, all hereafter more fully referred to and described.

Referring to Figs. 1 and 2, the spring constituting the resilient element of the wheel is composed of four elements together forming a spring A conforming to the design or configuration there shown. The bases of the spring-elements A are so constructed as to have a long bearing surface on the rim B, indeed the complete spring actually covers almost the whole inner circumference of the rim of the wheel, and this is seen to advantage in Fig. 1. The two rim rings C, D, riveted or held in position by screws e, f, or otherwise attached to the rim B aforesaid are used, one on either side to prevent movement and displacement of the spring in its proper position within the wheel. The hub G consists of a piece of metal of cruciform configuration having a central hole H for the spindle or axle of the wheel. Two side plates I, J, one on either side of hub G and connected thereto by bolts K retain the spring in its desired position. Short sections of metal constituting distance pieces L may or may not be used interposed between the loops and side plates aforesaid.

The spring A is shown in both Figs. 1 and 2 as composed of four sections fitted to the hub G, the loose ends of the spring resting against the crosses of the hub. Bolts O disposed on either side of ends of spring and passing through the two hub plates are used to control the movement of the spring when driving as shown in Fig. 2.

Referring to Fig. 4, the base of the spring A has an indentation or concave hollow M which is designed to fit over the semicircular projection N formed on the inner circumference of the rim B as seen. It is to be understood that all the bases of the spring may be similarly constructed with indentations engaging with projections. The spring A owing to its length of bearing or portion covering the inner circumference of the rim acts as a support and imparts stability to the rim, and has a well distributed pressure drive on the rim, for the spring drives by its own fit thereinto, consequently it is very efficient.

Claims:

1. A resilient wheel for vehicles comprising in combination a rim, a hub structure formed with crosses and having side plates, and bolts connecting said side plates and two or more resilient sections intermediate said rim and said hub structure, the bases of the sections covering a relatively large proportion of the inner circumference of the rim, and the loose end of each of the resilient sections resting against the crosses of the hub structure and the movement thereof being controlled by said bolts.

2. A resilient wheel for vehicles comprising in combination a rim, a hub structure formed with crosses and having two plates arranged one on each side of said crosses, and two or more resilient sections intermediate said rim and said hub structure, the bases of the sections covering a relatively large proportion of the inner circumference of the rim, and the loose ends of each of the sections resting against the crosses of the hub.

In witness whereof I affix my signature in presence of two witnesses.

ESTHER MURRAY.

Witnesses:
 JOHN LIDDLE,
 JOHN TRAIN LIDDLE.

Copies of this patent may be obtained for five cents each, by addressing the "Commissioner of Patents, Washington, D. C."